(12) United States Patent
Tsai et al.

(10) Patent No.: US 8,973,837 B2
(45) Date of Patent: Mar. 10, 2015

(54) ELECTRONIC CARD

(71) Applicant: SiPix Technology Inc., Taoyuan County (TW)

(72) Inventors: Yu-Chun Tsai, Chiayi County (TW); Yao-Jen Hsieh, Hsinchu County (TW); Shao-Wei Su, Taoyuan County (TW); Chun-An Wei, New Taipei (TW)

(73) Assignee: SiPix Technology Inc., Taoyuan (TW)

( * ) Notice: Subject to any disclaimer, the term of this patent is extended or adjusted under 35 U.S.C. 154(b) by 79 days.

(21) Appl. No.: 13/748,610

(22) Filed: Jan. 24, 2013

(65) Prior Publication Data

US 2013/0233930 A1  Sep. 12, 2013

(30) Foreign Application Priority Data

Mar. 9, 2012 (TW) .............................. 101108145 A

(51) Int. Cl.
  *G06K 19/06* (2006.01)
  *G06K 19/077* (2006.01)
  *G06K 19/07* (2006.01)
(52) U.S. Cl.
  CPC ...... *G06K 19/07707* (2013.01); *G06K 19/0717* (2013.01)
  USPC ...................................................... 235/492
(58) Field of Classification Search
  CPC .......... G06Q 20/341; G06K 19/07703; G06K 19/077
  USPC ................................................... 235/487, 492
  See application file for complete search history.

(56) References Cited

U.S. PATENT DOCUMENTS 8,011,592 B2 *  9/2011  Wang .............................. 235/492
8,061,600 B2 * 11/2011  Goel et al. ..................... 235/383

FOREIGN PATENT DOCUMENTS

TW      M366952       10/2009
TW      201209787      3/2012

OTHER PUBLICATIONS

"Office Action of Taiwan Counterpart Application", issued on May 23, 2014, p. 1-p. 6.

* cited by examiner

*Primary Examiner* — Jamara Franklin
(74) *Attorney, Agent, or Firm* — Jianq Chyun IP Office

(57) ABSTRACT

An electronic card including a first substrate, a control unit, a display unit and a driving circuit is provided. The control unit is disposed on the first substrate, receives an external voltage so as to convert the external voltage into an operation voltage, and selectively receives or provides display data. The driving circuit is disposed on the first substrate, coupled to the control unit and the display unit, and outputs a driving signal to the display unit to drive the display unit according the operation voltage and the display data.

6 Claims, 2 Drawing Sheets

ELECTRONIC CARD

CROSS-REFERENCE TO RELATED APPLICATION

This application claims the priority benefit of Taiwan application serial no. 101108145, filed on Mar. 9, 2012. The entirety of the above-mentioned patent application is hereby incorporated by reference herein and made a part of this specification.

BACKGROUND OF THE INVENTION

1. Field of the Invention

The invention relates to an electronic card. Particularly, the invention relates to an electronic card capable of enhancing the life span thereof.

2. Description of Related Art

In recent years, electronic cards (for example, credit cards and access cards) have been widely used and become indispensable electronic products in people's daily life. Moreover, with development of semiconductor technology, circuit complexity within a single chip is enhanced, and the single chip may implement more and more functions. In order to ensure the electronic card to provide diversified functions, the number of circuits within the electronic card is increased. Due to modulization of the circuits, the circuits in the electronic card are probably distributed to a plurality of substrates, i.e. joints of the substrates in the electronic card are relatively more. Now, if the electronic card is bended, wires between the circuits are probably damaged to shorten a life span of the electronic card. Therefore, it is an important issue to integrate the circuits in the electronic card to reduce the number of the used substrates.

SUMMARY OF THE INVENTION

The invention is directed to an electronic card, in which circuits are integrated to reduce substrate joints to improve a life span of the electronic card.

The invention provides an electronic card including a first substrate, a control unit, a display unit and a driving circuit. The control unit is disposed on the first substrate, and receives an external voltage for converting into an operating voltage, and selectively receives or provides display data. The driving circuit is disposed on the first substrate, and coupled to the control unit and the display unit, and outputs a driving signal to the display unit to drive the display unit according the operating voltage and the display data.

In an embodiment of the invention, the display unit is disposed on the first substrate.

In an embodiment of the invention, the electronic card further includes a second substrate bonded to the first substrate, where the display unit is disposed on the second substrate.

In an embodiment of the invention, the electronic card further includes a temperature sensing unit disposed on the first substrate and coupled to the control unit. The temperature sensing unit senses an environment temperature of the electronic card, and outputs a temperature parameter to the control unit, and the control unit controls the driving circuit to output the driving signal according to the temperature parameter.

In an embodiment of the invention, when the environment temperature is lower than a predetermined low level, the control unit controls the driving circuit to increase a voltage difference between a voltage level of the driving signal and a common voltage or increase a driving time of the driving signal (for example, selects a driving signal with a longer time or prolongs the driving time of the driving signal) according to the temperature parameter, and when the environment temperature is higher than a predetermined high level, the driving circuit decreases the voltage difference between the voltage level of the driving signal and the common voltage or decreases the driving time of the driving signal (for example, selects a driving signal with a shorter time or shortens the driving time of the driving signal) according to the temperature parameter.

In an embodiment of the invention, the electronic card further includes a gravity sensing unit, which is disposed on the first substrate and coupled to the control unit. The gravity sensing unit senses a movement of the electronic card, and outputs a movement parameter to the control unit. The control unit controls the driving circuit to output the corresponding driving signal to drive the display unit according to the movement parameter.

According to above descriptions, the circuits in the electronic card of the invention are integrated to reduce the joints of the substrates, so as to reduce an adverse effect caused by bending of the electronic card.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
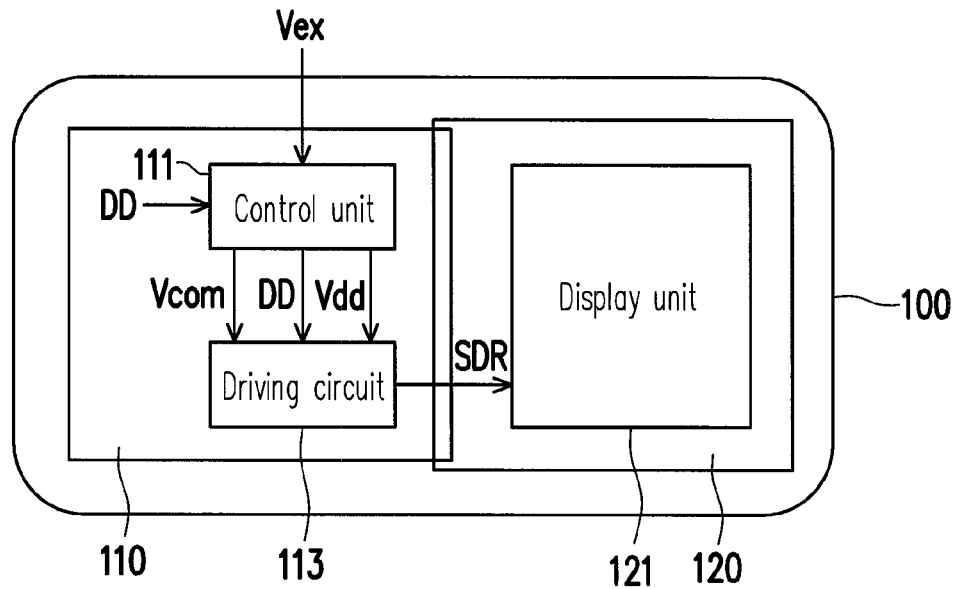
FIG. 1 is a system schematic diagram of an electronic card according to an embodiment of the invention.

FIG. 1 is a system schematic diagram of an electronic card according to an embodiment of the invention. Referring to FIG. 1, in the present embodiment, the electronic card 100 includes a first substrate 110, a second substrate 120, a control unit 111, a driving circuit 113 and a display unit 121. The control unit 111 is disposed on the first substrate 110, and receives an external voltage Vex for converting into an operating voltage Vdd, and selectively receives or provides display data DD. When the control unit 111 receives the display data DD, it can directly output the display data DD. Otherwise, the control unit 111 can generate the display data DD according to a control demand or internal data. The display data DD received by the control unit 111 can be generated or provided by an other device (for example, a memory or a chip) in the electronic card 100, or can be received from external of the electronic card 100, which is not limited by the invention.

The display unit 121 is disposed on the second substrate 120. The driving circuit 113 is disposed on the first substrate 110, and is coupled to the control unit 111 and the display unit 121. When the driving circuit 113 receives the operating voltage Vdd, the driving circuit 113 performs circuit operation according to the operating voltage Vdd. When the driving circuit 113 receives the display data DD, the driving circuit 113 outputs driving signals SDR to the display unit 121 to drive the display unit 121 according to the display data DD. In the present embodiment, the second substrate 120 is bonded to the first substrate 110 to couple the driving circuit 113 to the display unit 121. In this way, the circuits (for example, the control unit 111, the driving circuit 113 and the display unit 121) of the electronic card 100 are respectively disposed on the first substrate 110 and the second substrate 120 to reduce the number of joints of the substrates, so as to reduce the adverse effect caused by bending of the electronic card 100.

Moreover, in the present embodiment, the control unit 111 can further provide a common voltage Vcom to the driving circuit 113 to serve as basis of circuit operation performed by the driving circuit 113.

Figure 2:
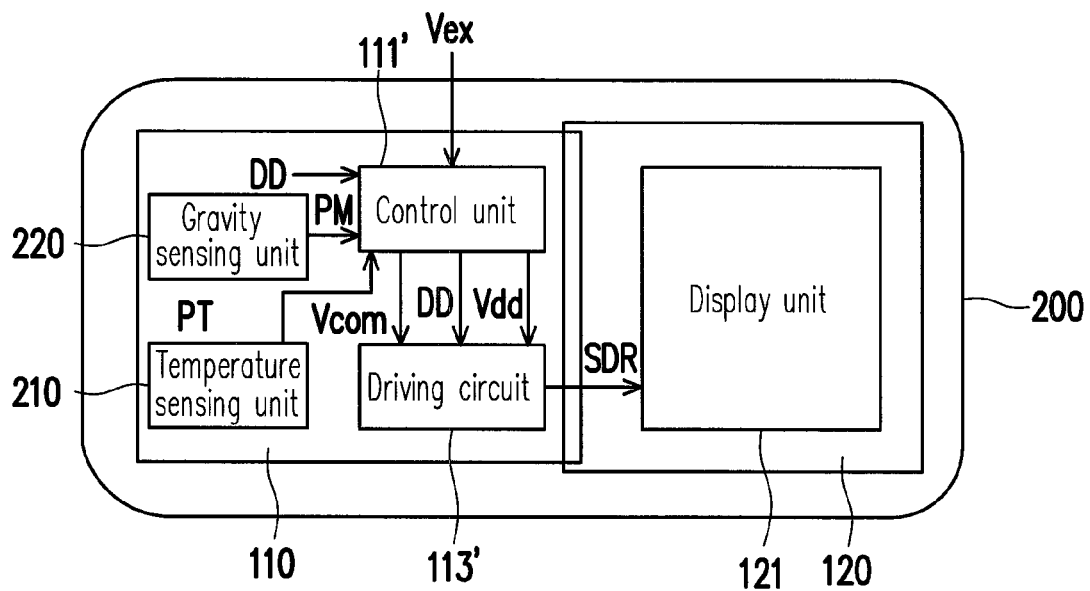
FIG. 2 is a system schematic diagram of an electronic card according to another embodiment of the invention.

FIG. 2 is a system schematic diagram of the electronic card according to another embodiment of the invention. Referring to FIG. 1 and FIG. 2, in which like reference numerals refer to the like elements, and a difference there between is that the electronic card 200 further includes a temperature sensing unit 210 and a gravity sensing unit 220. The temperature sensing unit 210 is disposed on the first substrate 110 and is coupled to a control unit 111'. The temperature sensing unit 210 senses an environment temperature of the electronic card 200, and outputs a temperature parameter PT to the control unit 111', and the control unit 111' controls a driving circuit 113' to output the driving signal SDR to drive the display unit 121 according to the temperature parameter PT.

Further, when the environment temperature becomes lower (for example, when the environment temperature is lower than a predetermined low level), the display unit 121 is slow in response to the driving signal SDR, and now the control unit 111' controls the driving circuit 113' to increase a voltage difference between a voltage level of the driving signal SDR used for driving the display unit 121 and the common voltage Vcom according to the temperature parameter PT, so as to improve a response speed of the display unit 121, and/or controls the driving circuit 113' to increase a driving time of the driving signal SDR according to the temperature parameter PT. When the environment temperature becomes higher (for example, higher than a predetermined high level), the display unit 121 is fast in response to the driving signal SDR, and now the control unit 111' controls the driving circuit to decrease the voltage difference between the voltage level of the driving signal SDR used for driving the display unit 121 and the common voltage Vcom according to the temperature parameter PT, so as to decreased the response speed of the display unit 121, and/or controls the driving circuit 113' to decrease the driving time of the driving signal SDR according to the temperature parameter PT. In this way, the voltage level and/or the driving time of the driving signal SDR can be adjusted according to the environment temperature, so as to optimise the display quality of the display unit 121 and avoid additional power consumption.

The gravity sensing unit 220 is disposed on the first substrate 110 and is coupled to the control unit 111'. The gravity sensing unit 220 senses a movement of the electronic card 200 (for example, shift or rotation), and outputs a movement parameter PM to the control unit 111'. The control unit 111' controls the driving circuit 113' to output the driving signal SDR to drive the display unit 121 according to the movement parameter PM. In other words, the control unit 111' can receive or output the corresponding display data DD according to the movement parameter PM, and the driving circuit 113' outputs the corresponding driving signal SDR according to the display data DD, so as to drive the display unit 121 to display. In this way, the electronic card 200 can implement an input operation without using an input device, so as to avoid pressing the electronic card 200 when operating the input device (for example, a button), and avoid damaging the wires due to bending of the electronic card 200.

Moreover, in the present embodiment, the temperature sensing unit 210 and the gravity sensing unit 220 can be selectively configured, i.e. the temperature sensing unit 210 can be selectively configured in some embodiments, and gravity sensing unit 220 can be selectively configured in some other embodiments, which can be varied by those skilled in the art according to a usage environment of the electronic card, and is not limited by the invention.

Figure 3:
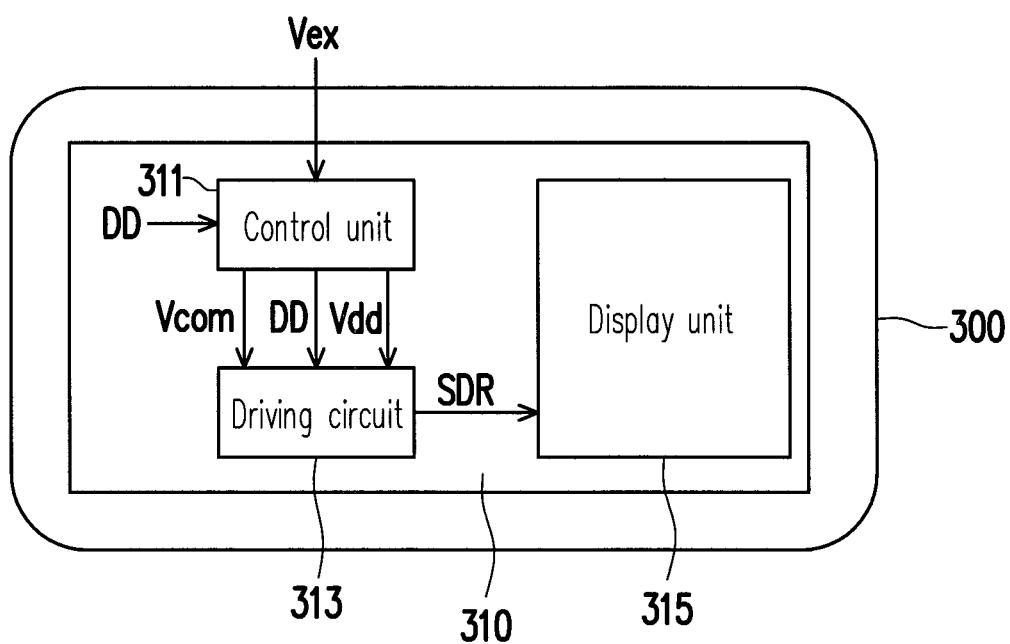
FIG. 3 is a system schematic diagram of an electronic card according to still another embodiment of the invention.

FIG. 3 is a system schematic diagram of an electronic card according to still another embodiment of the invention. Referring to FIG. 1 and FIG. 3, in the present embodiment, the electronic card 300 includes a first substrate 310, a control unit 311, a driving circuit 313 and a display unit 315. The control unit 311, the driving circuit 313 and the display unit 315 are disposed on the first substrate 310, where the control unit 111 can be referred for the operation of the control unit 311, the driving circuit 113 can be referred for the operation of the driving circuit 313, and the display unit 121 can be referred for the operation of the display unit 315, which are not repeated herein. Compared to the embodiment of FIG. 1, a difference of the embodiment of FIG. 3 is that the first substrate 110 and the second substrate 120 of FIG. 1 are integrated as a single substrate. In this way, since the circuits (for example, the control unit 311, the driving circuit 313 and the display unit 315) of the electronic card 300 are disposed on the single first substrate 310, influence on the wires of the electronic card 300 due to bending of the electronic card 300 can be greatly reduced, and a life span of the electronic card 300 can be greatly prolonged.

In summary, in the electronic card of the invention, the circuits on the electronic card are integrated on two substrates or one substrate, so as to reduce the number of joints of the substrates. In this way, the adverse effect caused by bending the electronic card is reduced. Moreover, the temperature sensing unit can be configured in the electronic card, so that eh driving circuit can adjust the voltage level of the driving signal according to an environment temperature. In this way, the display quality of the display unit is optimised, and extra power consumption is avoided. In addition, the gravity sensing unit can be configured in the electronic card, so that the control unit can adjust a display content of the display unit according to the movement of the electronic card. In this way, the electronic card can implement an input operation without using an input device, so as to avoid pressing the electronic card when operating the input device, and avoid damaging the wires due to bending of the electronic card.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. An electronic card, comprising:
a first substrate;
a control unit, disposed on the first substrate, and receiving an external voltage for converting into an operating voltage, and selectively receiving or providing display data;
a display unit;
a driving circuit, disposed on the first substrate, and coupled to the control unit and the display unit, and outputting a driving signal to the display unit to drive the display unit according the operating voltage and the display data; and a temperature sensing unit disposed on the first substrate and coupled to the control unit, wherein the temperature sensing unit senses an environment temperature of the electronic card and outputs a temperature parameter to the control unit, and the control unit controls the driving circuit to output the corresponding driving signal according to the temperature parameter.

2. The electronic card as claimed in claim 1, wherein the display unit is disposed on the first substrate.

3. The electronic card as claimed in claim 1, further comprising a second substrate bonded to the first substrate, wherein the display unit is disposed on the second substrate.

4. The electronic card as claimed in claim 1, wherein when the environment temperature is lower than a predetermined low level, the control unit controls the driving circuit to increase a voltage difference between a voltage level of the driving signal and a common voltage according to the temperature parameter, and when the environment temperature is higher than a predetermined high level, the control unit controls the driving circuit to decrease the voltage difference between the voltage level of the driving signal and the common voltage according to the temperature parameter.

5. The electronic card as claimed in claim 1, wherein when the environment temperature is lower than a predetermined low level, the control unit controls the driving circuit to increase a driving time of the driving signal according to the temperature parameter, and when the environment temperature is higher than a predetermined high level, the control unit controls the driving circuit to decrease the driving time of the driving signal according to the temperature parameter.

6. The electronic card as claimed in claim 1, further comprising a gravity sensing unit disposed on the first substrate and coupled to the control unit, wherein the gravity sensing unit senses a movement of the electronic card, and outputs a movement parameter to the control unit, and the control unit controls the driving circuit to output the corresponding driving signal to drive the display unit according to the movement parameter.

* * * * *